(12) United States Patent  
Slayne et al.

(10) Patent No.: US 8,482,882 B2
(45) Date of Patent: Jul. 9, 2013

(54) MOUNTING ASSEMBLY

(71) Applicants: Andrew Robert Slayne, Bristol (GB); Simon Alan Hughes, Bristol (GB)

(72) Inventors: Andrew Robert Slayne, Bristol (GB); Simon Alan Hughes, Bristol (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 0 days.

(21) Appl. No.: 13/743,065

(22) Filed: Jan. 16, 2013

(65) Prior Publication Data

US 2013/0128389 A1 May 23, 2013

Related U.S. Application Data

(62) Division of application No. 12/556,674, filed on Sep. 10, 2009, now Pat. No. 8,363,359.

(60) Provisional application No. 61/095,841, filed on Sep. 10, 2008.

(51) Int. Cl.
*G11B 21/02* (2006.01)
*F16C 27/00* (2006.01)

(52) U.S. Cl.
USPC ........................... 360/265.6; 384/535

(58) Field of Classification Search
USPC ....... 360/265.6, 265.2; 403/365, 372; 384/535
See application file for complete search history.

(56) References Cited

U.S. PATENT DOCUMENTS

| 3,700,271 | A | 10/1972 | Blaurock et al. |
| 3,838,928 | A | 10/1974 | Blaurock et al. |
| 4,286,894 | A | 9/1981 | Rongley |
| 4,790,683 | A | 12/1988 | Cramer et al. |
| 5,315,465 | A | 5/1994 | Blanks |
| 5,988,885 | A | 11/1999 | Heshmat |
| 6,163,441 | A | 12/2000 | Wood et al. |
| 6,288,878 | B1 | 9/2001 | Misso et al. |
| 6,411,472 | B1 | 6/2002 | Allsup |
| 6,480,363 | B1 | 11/2002 | Prater |
| 6,655,847 | B2 | 12/2003 | Obara et al. |
| 6,754,046 | B2 | 6/2004 | Barina et al. |

(Continued)

FOREIGN PATENT DOCUMENTS

| CN | 1459007 A | 11/2003 |
| EP | 1985875 A | 10/2008 |

(Continued)

OTHER PUBLICATIONS

International Search Report from PCT Application No. PCT/IB2009/006835 dated Dec. 16, 2009, 2 pgs.

*Primary Examiner* — Will J Klimowicz

(74) *Attorney, Agent, or Firm* — Abel Law Group, LLP; Chi Suk Kim (57) ABSTRACT

A tolerance ring is disclosed and can include a strip of material having a length, a first end, a second end opposite the first end, and a plurality of radially extending projections between the first and second ends. The strip of material can be curved into a ring having a gap. The radially extending projections are configured to be compressible between a bore and a shaft. A width and/or a height of a radially extending projection closest to the first end is different from a width and/or a height of a radially extending projection closest to a line extending perpendicular to the length and bisecting the strip of material within a circumferential row of the radially extending projections.

20 Claims, 7 Drawing Sheets

U.S. PATENT DOCUMENTS

| | | |
|---|---|---|
| 7,054,111 B2 | 5/2006 | Dominguez et al. |
| 7,580,225 B2 | 8/2009 | Hanrahan et al. |
| 7,583,476 B2 | 9/2009 | Hanrahan et al. |
| 7,850,389 B2 | 12/2010 | Hanrahan et al. |
| 7,922,418 B2 | 4/2011 | Baker et al. |
| 7,978,437 B2 | 7/2011 | Hanrahan et al. |
| 8,021,072 B2 | 9/2011 | Court et al. |
| 2002/0118490 A1 | 8/2002 | Macpherson et al. |
| 2003/0053260 A1 | 3/2003 | Barina et al. |
| 2005/0225903 A1 | 10/2005 | Sprankle et al. |
| 2006/0181811 A1 | 8/2006 | Hanrahan et al. |
| 2006/0228174 A1 | 10/2006 | Woodhead et al. |
| 2006/0275076 A1 | 12/2006 | Hanrahan et al. |
| 2007/0096572 A1 | 5/2007 | Watkins et al. |
| 2008/0043374 A1 | 2/2008 | Hanrahan et al. |
| 2008/0043375 A1 | 2/2008 | Hanrahan et al. |
| 2008/0199254 A1 | 8/2008 | Baker et al. |
| 2008/0266717 A1 | 10/2008 | Court et al. |
| 2008/0267693 A1 | 10/2008 | Court et al. |

FOREIGN PATENT DOCUMENTS

| | | | |
|---|---|---|---|
| JP | 5-205413 A | | 8/1993 |
| JP | 2003-247542 A | | 9/2003 |
| JP | 2012183577 A | * | 9/2012 |
| WO | 01/59314 A | | 8/2001 |
| WO | 03/025907 A | | 3/2003 |

* cited by examiner

MOUNTING ASSEMBLY

CROSS-REFERENCE TO RELATED APPLICATION(S)

The present application is a divisional of and claims priority to U.S. Non-provisional patent application Ser. No. 12/556,674, filed Sep. 10, 2009, now U.S. Pat. No. 8,363,359 B2, entitled "Mounting Assembly," naming inventors Andrew Robert Slayne and Simon Alan Hughes, which application claims priority to U.S. Provisional Patent Application No. 61/095,841, filed Sep. 10, 2008, entitled "Mounting Assembly," naming inventors Andrew Robert Slayne and Simon Alan Hughes, of which both applications are incorporated by reference herein in their entirety.

FIELD OF THE DISCLOSURE

The present disclosure relates to apparatus comprising mating inner and outer components, which are mounted together using a tolerance ring.

In an embodiment, the apparatus can be used for mounting an arm on a bearing to form a pivot.

BACKGROUND

It is known to connect together mating inner and outer components using a tolerance ring. For example, a tolerance ring may be sandwiched between a shaft that is located in a corresponding bore formed in a housing, or it may act as a force limiter to permit torque to be transmitted between the shaft and the housing. The use of a tolerance ring accommodates minor variations in the diameter of the inner and outer components without substantially affecting their interconnection.

Typically, a tolerance ring comprises a band of resilient material, e.g. a metal such as spring steel, the ends of which are brought towards one another to form a ring. A strip of projections extends radially from the ring either outwardly or inwardly towards the centre of the ring. The projections can be formations, possibly regular formations, such as corrugations, ridges, waves or fingers. The band thus comprises an unformed region from which the projections extend, e.g. in a radial direction. There may be one or more rows of projections.

In use, the tolerance ring is located between the components, e.g. in the annular space between the shaft and bore in the housing, such that the projections are compressed between the inner and outer components. Typically, all of the projections extend either outwardly or inwardly so that one of the inner and outer component abuts projections and the other abuts the unformed region. Each projection acts as a spring and exerts a radial force against the components, thereby providing an interference fit between them. Rotation of the inner or outer component will produce similar rotation in the other component as torque is transmitted by the ring. Likewise, linear movement of either component will produce similar linear movement in the outer component as linear force is transmitted by the ring.

If forces (rotational or linear) are applied to one or both of the inner and outer components such that the resultant force between the components is above a threshold value, the inner and outer components can move relative to one another, i.e. the tolerance ring permits them to slip.

Typically tolerance rings comprise a strip of resilient material that is curved to allow the easy formation of a ring, e.g. by overlapping the ends of the strip.

During assembly of apparatus with an interference fit between components, a tolerance ring is typically held stationary with respect to a first (inner or outer) component whilst a second component is moved into mating engagement with the first component, thereby contacting and compressing the projections of the tolerance ring to provide the interference fit. The amount of force required to assemble the apparatus may depend on the stiffness of the projections and the degree of compression required. Likewise, the load transmitted by the tolerance ring in its final position and hence the amount of retention force provided or torque that can be transmitted may also depend on the size of the compression force and the stiffness and/or configuration of the projections.

One example of the use of a tolerance ring is in a hard disk drive (HDD) pivot mount, where the tolerance ring provides axial retention between a rotatable pivot shaft and an arm mounted thereon. In conventional pivot mounts, the tolerance ring provides an interference fit between the arm and a bearing mounted on the shaft. Typically the bearing comprises two pairs of races which are axially separated from each other by a spacer. Since the components in pivot mounts are very small and sensitive, the bearing is often protected by a surrounding sleeve (a "sleeved pivot"). The sleeve often has the spacer machined on its inner surface. In such arrangements the tolerance ring is sandwiched between the sleeve and the arm. Whilst sleeved pivots are less prone to damage and therefore are less likely to adversely affect hard disk drive performance, the precise machining required to form the spacer on the inner surface of the sleeve and the desire to use less material in the manufacture of pivot mounts has led to the introduction of sleeveless pivots.

In sleeveless pivots, the outer race of each part of races is exposed, and the spacer comprises an annular band located axially ("floating") between them. The spacer is held in place by an axial pre-loading force exerted on the bearing. In such arrangements the tolerance ring is located between the outer races of the bearing and the arm.

The coupling between mating components may exhibit resonant behavior, i.e. where external vibrations are amplified in the coupling. The resonant frequency or frequencies of an assembly are important in determining the operation of that assembly. For example, in hard disk drive pivot mounts accurate data writing cannot take place when resonance occurs, so it is important to know the frequency of resonance. The resonant frequency may depend on amount of compression that takes place during installation.

SUMMARY

At its most general, the present disclosure proposes varying the stiffness of tolerance ring waves around the circumference to even out the compression force experienced by an inner component held within the tolerance ring in use. The stiffness of the waves may provide means for controlling the compression force experienced by the inner component, which in turn may affect the properties of that component.

In one example, the inner component may be a bearing, e.g. a bearing mounting on a shaft forming part of a hard disk drive HDD pivot. Uneven compression forces exerted by the waves of the tolerance ring may cause distortion of the bearing. This may occur especially if the outward facing wall (e.g. the sleeve or outward facing wall of each race) of the bearing is thin, which is typical in small scale apparatus. Distortion of the bearing can have an effect on the resonant frequency of the pivot joint in use, e.g. by contributing to bearing stiffness and rotation torque profile. By evening out the compression forces experienced by the bearing, distortion can be controlled, e.g. minimized, which may provide greater control over the resonant frequency of the pivot joint in use.

In one aspect, an apparatus can comprise an inner component, an outer component which mates with the inner component, and a tolerance ring located between the inner and outer components to provide an interference fit there between, wherein the tolerance ring comprising a split ring having a plurality of radially extending projections which are compressible between the inner and outer components, and in which in the stiffness of the projections varies around the circumference of the tolerance ring.

The tolerance ring may comprise a strip of material that is curved into the split ring configuration. The strip of material may comprise an unformed region from which all the projections extend in the same direction, e.g. either all radially inward or all radially outward. The projections may be press-formed in the strip of material. With this configuration the unformed surface of the tolerance ring abuts one of the inner and outer components, and the projections abut the other of the inner and outer components.

The stiffness of a projection may be a measure of the force required to deform the projection to a certain radial distance from the unformed surface of the tolerance ring.

Each projection may be a circumferential hump which extends inwardly or outwardly in the radial direction. Each hump has a circumferential width within which it rises to and falls from a peak. There may be one or more series of humps, axially spaced from one another.

The stiffness of a projection may be altered by changing its circumferential width. Increasing the width of a projection whilst maintaining its radial height may soften the projection, i.e. decrease its stiffness. Alternatively or additionally, the stiffness of a projection may be altered by changing its radial height. Increasing the height of a projection whilst maintaining its circumferential width may harden a projection, i.e. increase its stiffness. Other methods of altering the stiffness of a projection can include altering the profile of the projection or altering the axial width of the projection. Varying the stiffness of the projections around the circumference of the tolerance ring may be achieved using any one of these techniques or both in combination.

The variation in stiffness may provide stiffer projections at the gap in the split ring, i.e. towards the ends of the strip of material that are curved towards each other to form the ring. It has been found that the since the projections at the gap are less constrained than those further around the ring they tend to exert lower forces. Stiffening the projections at the gap may enable the force exerted by the ring on the inner component to be distributed more evenly around its circumference.

The projections may include one or more edge projections located adjacent to the gap and a plurality of body projections around the ring between the edge projections associated with each side of the gap, wherein the edge projections have a higher stiffness than the body projections. Other stiffness profiles may be used. For example, the stiffness of the body projections may increase gradually towards the edge projections. In the HDD environment it is preferred to use a stiffness profile which provides an even force around the inner component. However, other environments may require different stiffness profiles, e.g. a stiffness profile which provides an uneven distribution of force around the circumference. By varying the stiffness of the projections, any type of stiffness profile can be implemented in a controllable and repeatable manner.

In another aspect, a hard disk drive pivot joint can include an arm having a bore therein, a shaft receivable in the bore, and a tolerance ring located between in the bore between the shaft and arm to provide an interference fit there between, wherein the tolerance ring comprising a split ring having a plurality of radially extending projections which are compressible between the shaft and arm, and in which in the stiffness of the projections varies around the circumference of the tolerance ring.

The shaft may have a bearing mounted thereon. The projections on the tolerance ring may extend radially outwardly only such that an unformed region abuts an outward facing surface of the bearing, and the projections abut an inward facing surface of the arm within the bore. This configuration may permit the force transmitted through the tolerance ring to be diffused by the unformed region over the outward facing surface of the bearing.

Hard disk drive pivot joints are small, so the tolerance ring may have a diameter of less than 16 mm in use.

In another aspect, a pre-assembly apparatus can be used for a hard disk drive pivot joint. The pre-assembly apparatus can comprise a tolerance ring mounted on either one of an arm with a bore therein, the tolerance ring being located in the bore, or a shaft receivable in a bore, the tolerance ring being located around the shaft, wherein the tolerance ring comprising a split ring having a plurality of radially extending projections whose stiffness varies around the circumference of the tolerance ring.

In one embodiment the pre-assembly comprises a tolerance ring with only radially outwardly extending projections located in a bore formed in an arm. The diameter of the bore may be smaller than the rest diameter of the tolerance ring, whereby the tolerance ring is retainable therein under its own resilience. The projections may engage the inward facing surface of the bore. A outward tapering axial edge may extend from one or both ends of the tolerance ring to act as a guide for an inner component (e.g. shaft) to be inserted into the pre-assembly, i.e. into the centre of the tolerance ring. Insertion of the inner component may deform the tolerance ring to compress the projections and provide an interference fit between the arm and the inner component.

In yet another aspect, tolerance ring comprising a split ring having a plurality of radially extending projections which are deformable to provide an interference fit between an inner component and an outer component of the pivot, wherein the stiffness of the projections varies around the circumference of the tolerance ring. The tolerance ring can be used in a hard disk drive pivot joint.

The tolerance ring may have any of the features discussed above with reference to the other aspects of the present disclosure.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
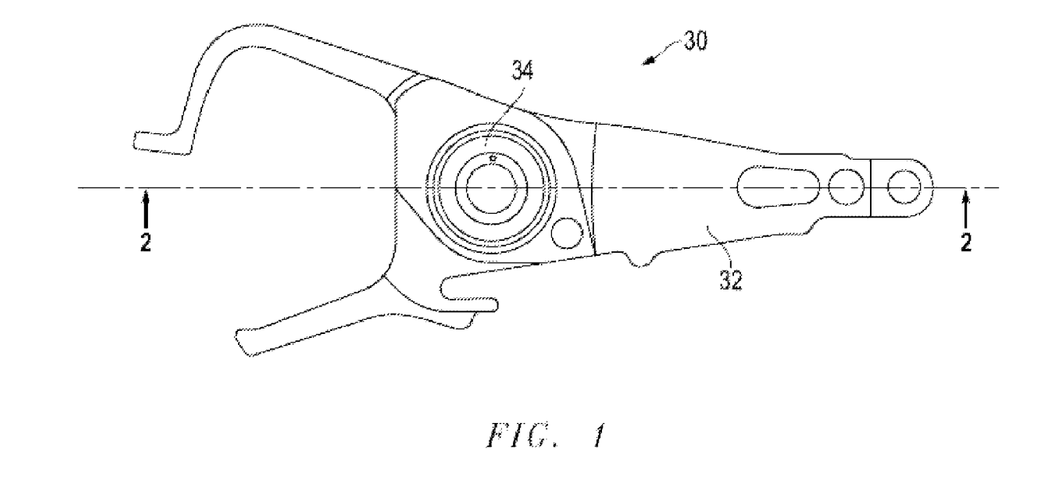
FIG. 1 shows a plan view of a conventional hard disk drive pivot mount which includes a tolerance ring.

FIG. 1 shows a known hard disk drive pivot mount 30, which comprises an arm 32 adapted to carry read/write heads and pivot 34 which is rotatable on a bearing about a shaft. A tolerance ring (not shown in FIG. 1) provides an interference fit between the pivot 34 and the arm 32 such that the arm rotates with the pivot.

Figure 2:
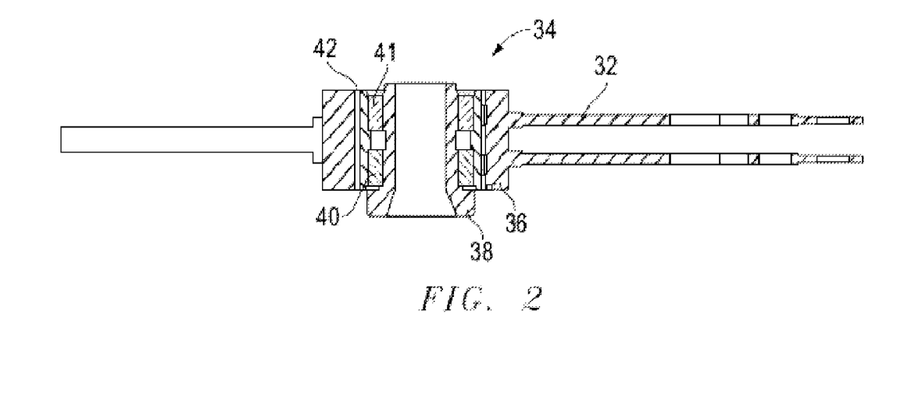
FIG. 2 shows a cross-section taken along the line X-X of the hard disk drive pivot mount shown in FIG. 1.

FIG. 2 shows a cross-section taken along the line 2-2 in FIG. 1. FIG. 2 shows that the arm 32 comprises a circumferential housing 36 which includes a bore in which the pivot 34 is received. The pivot 34 comprises a rotatable sleeve member 42 which is coupled to a shaft 38 via a pair of bearings 40, 41. FIG. 2 thus shows an example of a sleeved pivot. The tolerance ring fits between the outer surface of the rotatable sleeve member 42 and the inner surface of the bore formed in the circumferential housing 36. This is shown in more detail in FIG. 3, where it can be seen that a tolerance ring 20 having waves 28 substantially aligned with bearings 40, 41 is compressed between the rotatable sleeve member 42 and circumferential housing 36.

Figure 3:
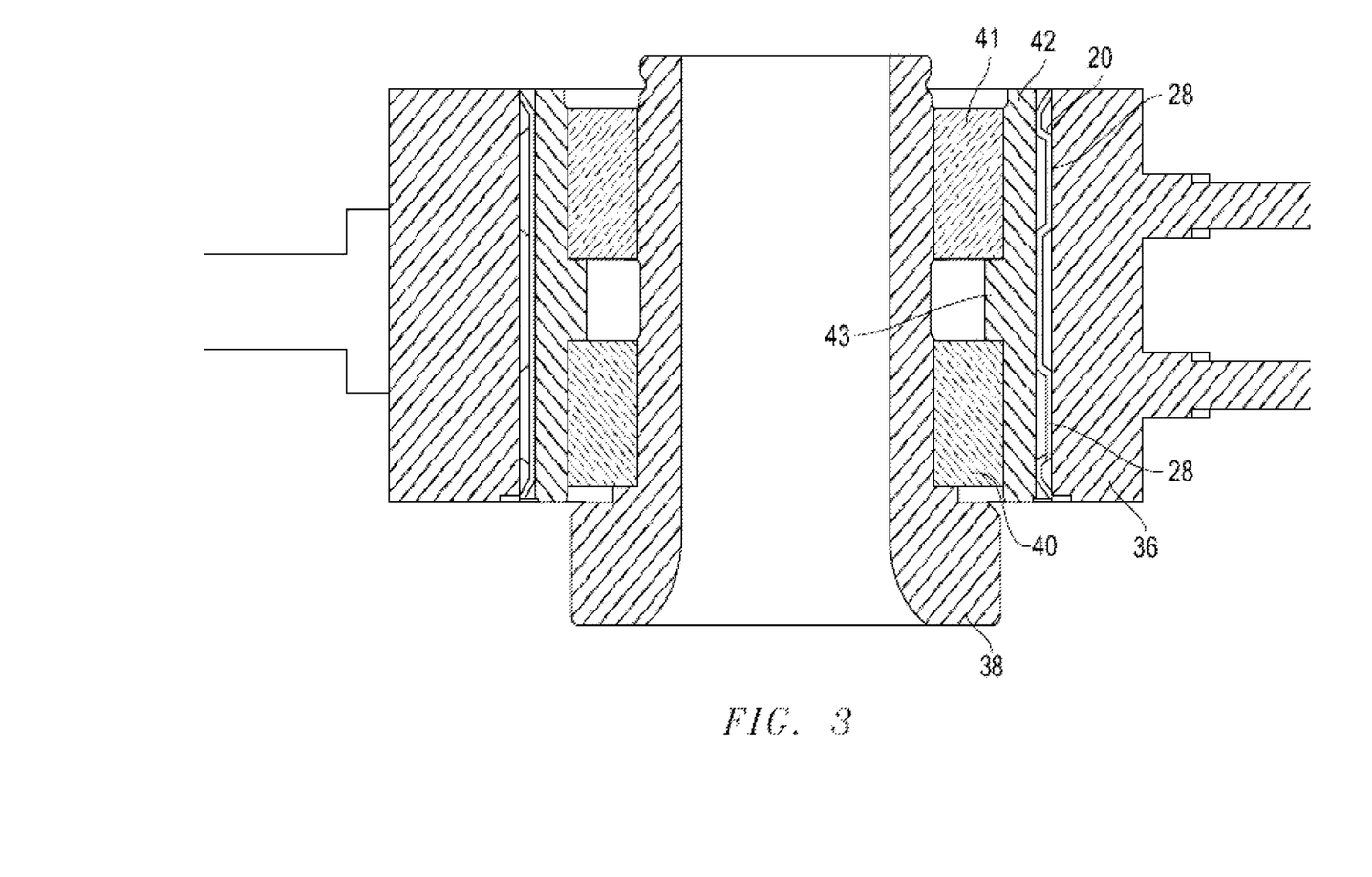
FIG. 3 shows a close-up of the coupling between the arm and sleeved pivot of the hard disk drive pivot mount shown in FIG. 1.

In FIG. 3 it can be seen that rotatable sleeve member 42 comprises an integral spacer element 43 which separates the bearings 40, 41.

Figure 4:
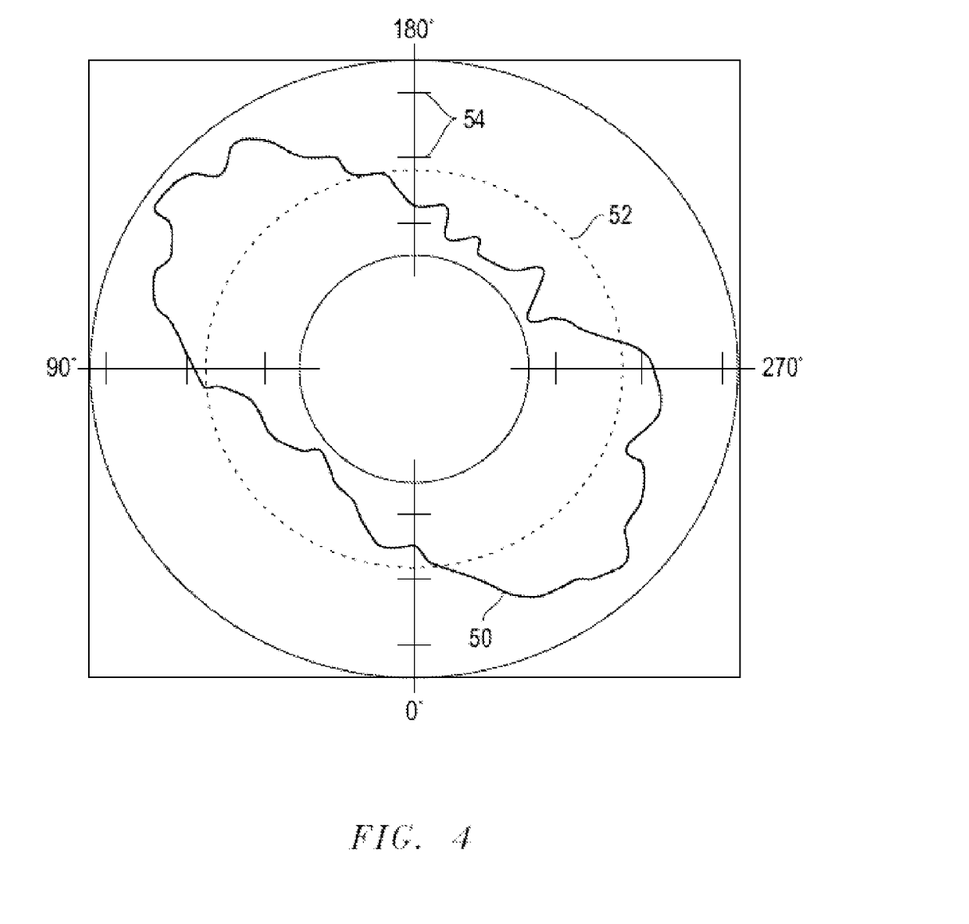
FIG. 4 is a exaggerated scale roundness trace of a bearing in a conventional pivot joint without even force distribution.
Figure 5:
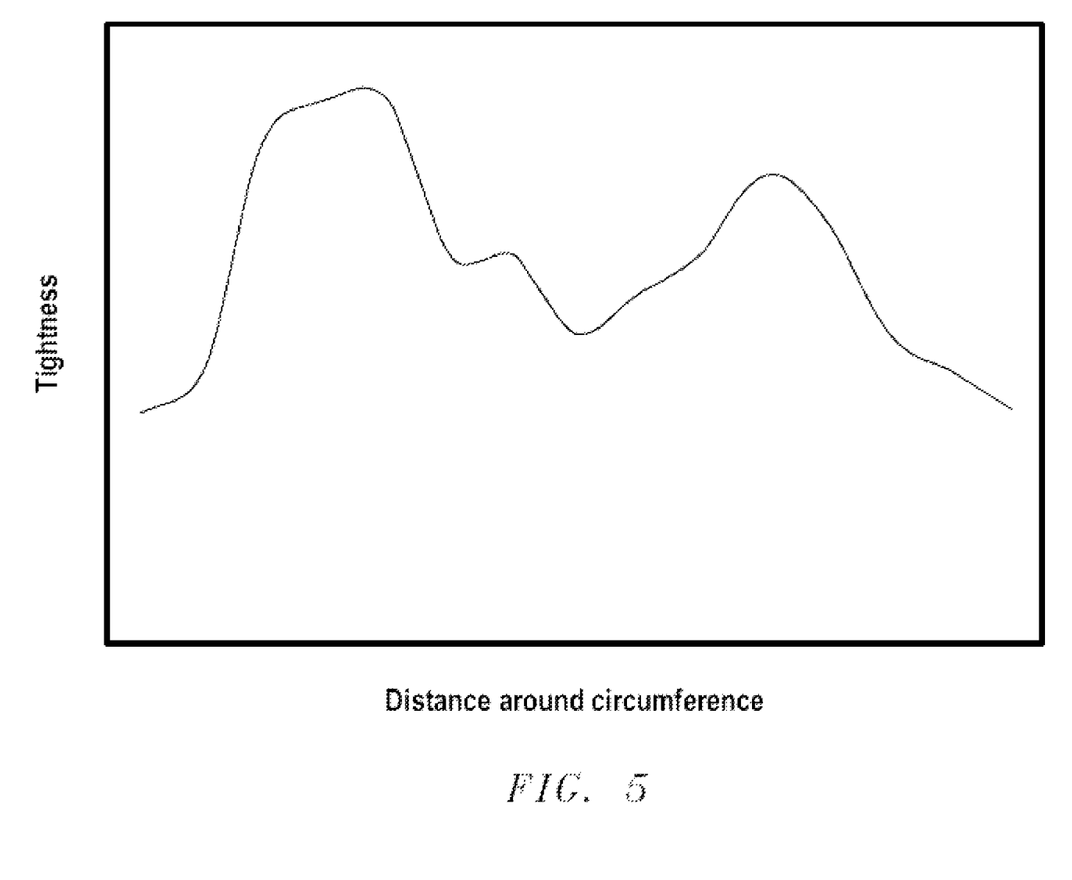
FIG. 5 is a schematic diagram illustrating how tightly balls are held in a bearing in a conventional pivot joint without even force distribution.
Figure 6:
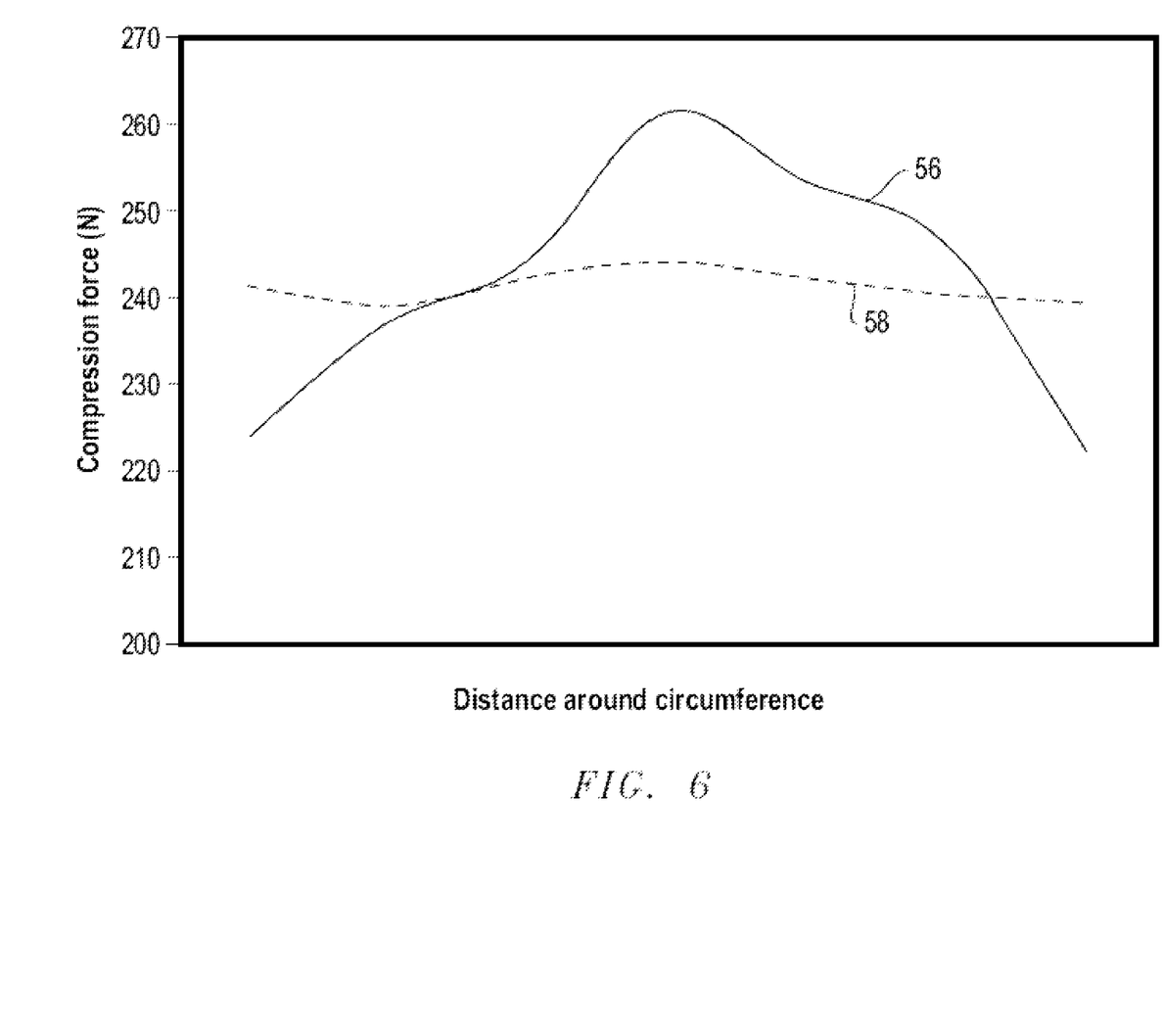
FIG. 6 is a schematic diagram illustrating compression force exerted through projections around a tolerance ring which are compressed to the same height for sample tolerance rings with and without projection stiffness modification.

FIGS. 4, 5 and 6 help to illustrate the problem that is addressed by the present disclosure. FIG. 4 is a graphical representation of plan view of a bearing wall 50 in an HDD pivot which is distorted in use by a conventional tolerance ring, i.e. a tolerance ring which has uniform projections. The scale is exaggerated to demonstrate the effect. A circular dotted line 52 represents the undistorted edge of the bearing wall. To give an idea of the scale of the distortion, the demarcations 54 on the 0°, 90°, 180° and 270° axes are at intervals of approximately 3 µm. The overall diameter of a bearing is around 15 mm, so the scale of the distortion is small relative to the diameter.

FIG. 4 shows that the bearing wall is distorted such that it is pushed in further in the 0°-90° quadrant and the 180°-270° quadrant and sticks out in the 90°-180° and 270°-0° quadrants. It has been found that the sticking out in one quadrant occurs at the gap in the tolerance ring. Because the projections at the gap have more freedom of movement they appear to exert a lower force. This freedom of movement is also reflected in looseness at the opposite side of the bearing because the bearing may shift towards the gap to occupy an off centre position where the forces through the projections adjacent the gap and opposite the gap are substantially equal. Thus, there is more play for the bearing wall at the gap and opposite the gap because the forces exerted by the projections in these regions is less than the other quadrants. The difference in the compression forces leads to the bearing wall distortion. The compression across the bearing from projections at the gap in the ring is less than those which are not at the gap.

FIG. 5 is a diagram showing how the distortion of the bearing wall manifests itself in the forces experiences by the balls held in the bearing's races, i.e. how tightly each ball is held in its race. FIG. 5 shows that there is significant variation of tightness around the circumference of the bearing. There are two tightness peaks, which correspond to the two pushed in areas seen in FIG. 4. Likewise there are two regions of looseness. These occur at the gap of the tolerance ring and opposite the gap of the tolerance ring.

FIG. 6 is a graph showing the compression force transmitted through tolerance ring projections that are compressed to a uniform height (in this example 0.29 mm) around the circumference of the tolerance ring. Line 56 is a plot of values obtained from a conventional tolerance ring having uniform projections. The compression force rises to a peak at the projections opposite the gap and is low at the projections adjacent to the gap, i.e. at the projections which less constrained due to the presence of the gap.

To reduce or minimize the distortion of the bearing wall, a tolerance ring can have projections that exhibit an even compression force around the circumference of the tolerance ring when compressed to a uniform height (e.g. corresponding to a given clearance), as illustrated by dotted line 58 in FIG. 6.

To achieve the even compression force it is necessary to vary the stiffness of the tolerance ring projections. Varying the stiffness permits the compression force delivered by a projection to be tailored to its location relative to the gap. To even out the compression force shown in FIG. 6, the projections at the gap need to provide a stronger compression force for a given clearance, i.e. be stiffer, and the waves in the centre need to provide a weaker compression force, i.e. be less stiff.

Figure 7:
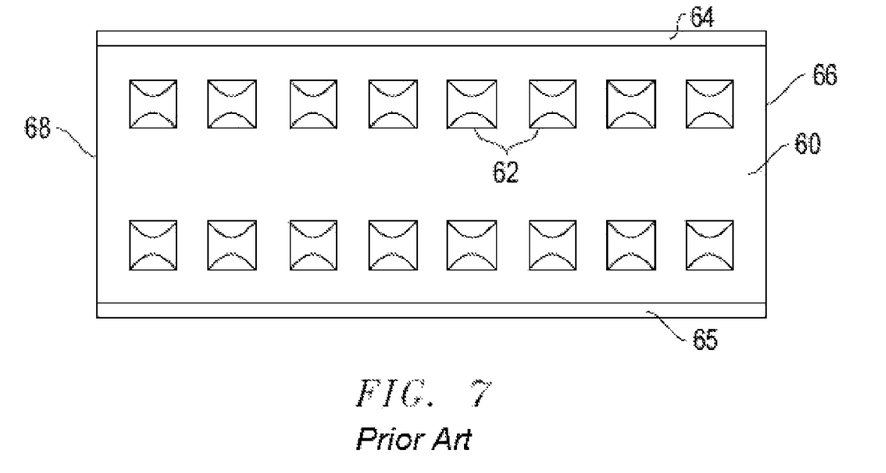
FIG. 7 is a plan view of a strip of material having projections formed therein for a conventional HDD tolerance ring.

FIG. 7 shows a strip of resilient material 60, e.g. spring steel, into which a two rows of projections 62 are press-formed, e.g. stamped. The strip 60 may be curved to form a tolerance ring by bring edges 66, 68 towards one another. The top and bottom edges 64, 65 are flared outwards (i.e. in the same direction as the projections 62) to provide an inwardly tapering guide surface for the tolerance ring. FIG. 7 shows a conventional tolerance ring in that all of the projections have the same size and shape.

Figure 8:
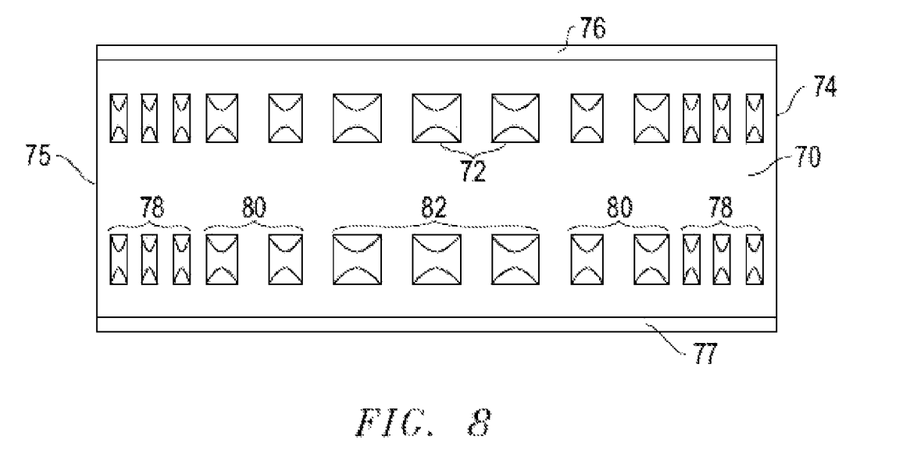
FIG. 8 is a plan view of a strip of material having projections formed therein for an HDD tolerance ring that is an embodiment of the present disclosure.

FIG. 8 shows an embodiment of a strip of resilient material 70 having a plurality of projections 72 press-formed therein which, when edges 74, 75 are curved towards one another so that the strip forms an annular band. The top and bottom edges 76, 77 are flared outwards as in FIG. 7.

Similarly to FIG. 7, the strip 70 in FIG. 8 has two rows of projections 72. However, in this embodiment each row has three different types of projection. At (i.e. adjacent) the edges 74, 75 there is a set of three edge projections 78. These projections have a narrower width (i.e. smaller circumferential extent) than but the same peak height as the projections 62 shown in FIG. 7. This means they are stiffer, i.e. exhibit a higher compression force for a given compression distance.

Circumferentially inwards of each set of edge projections 78 there is a set of two intermediate projections 80. These projections are wider than the edge projections but have the same height (i.e. peak extension away from the strip) and hence are less stiff than the edge projections.

Between the sets of intermediate projections 80 is a set of three body projections 82. The body projections are each wider than an intermediate projection but have the same height and hence are less stiff than the intermediate and edge projections. In this illustrated embodiment the body projections 82 are the same size as the projections in FIG. 7. This need not be the case. In fact, it may be preferred for the body projections to be less stiff than conventional projections.

In an embodiment, the difference in stiffness between the edge projections and the body projections can be at least about 2%, such as at least about 3%, even at least about 5%. In certain embodiments, the difference in stiffness between the edge projections and the body projections can be at least about 7%, even at least about 10%. In a particular embodiment, the stiffness of the edge projections can be not greater than about two times the stiffness of the body projections, such as not greater than about 1.9 times, such as not greater than about 1.8 times, even not greater than about 1.7 times. Further, the stiffness of the edge projections can be not greater than about 1.6 times the stiffness of the body projections, even as not greater than about 1.5 times.

The number and precise size of each type of projection may depend on the particular use. For example, there may be no intermediate projections. There may be only one edge projection in each row at each edge. Moreover, the projections in each set need not be identical. For example, the edge projections could each increase in width towards the intermediate or body projections, e.g. to provide a smooth transition between projection types. Similarly, the body projection may increase in width towards the centre of the strip, i.e. the location opposite the gap in use.

Although two rows of projections are illustrated, any number of rows may be used. The different types of projections are preferably aligned in all the rows.

Figure 9:
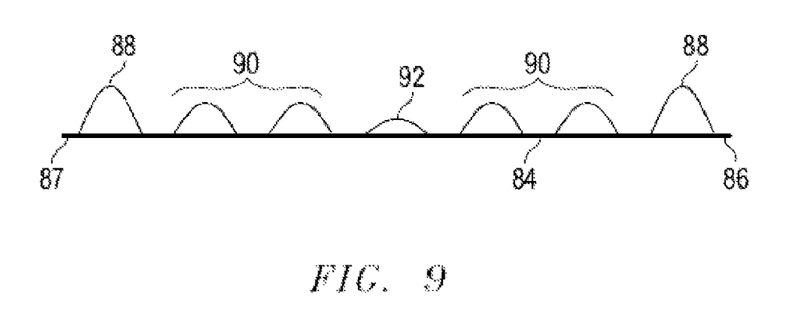
FIG. 9 is a side view of a strip of material having projections formed therein for an HDD tolerance ring that is another embodiment of the present disclosure.

FIG. 9 shows a cross-section through a row of projection on a sheet of material 84 for making a tolerance ring. In this embodiment the widths of each projection in the row is constant, but the peak extension varies. The relative heights of the projections are exaggerated for clarity.

Thus, at each edge 86, 87 there is an edge projection 88 which has a greater height (distance from unformed region 84) than the inner projections. Circumferentially inwards of the edge projections 88 is a set of two intermediate projections 90 which have an intermediate height. Between the intermediate projections there is a body projection 92 which has a lower height than the intermediate and edge projections. As with FIG. 8, the number of each type of projection may be different in other embodiments.

In practice, adjusting the stiffness profile of the projections may be achieved using a combination of the widening effect illustrated in FIG. 8 and the raising of wave height illustrated in FIG. 9. Other methods may also be used, e.g. altering the cross section shape of the projection by changing the angle of the slope of the hump or the like.

Figure 10:
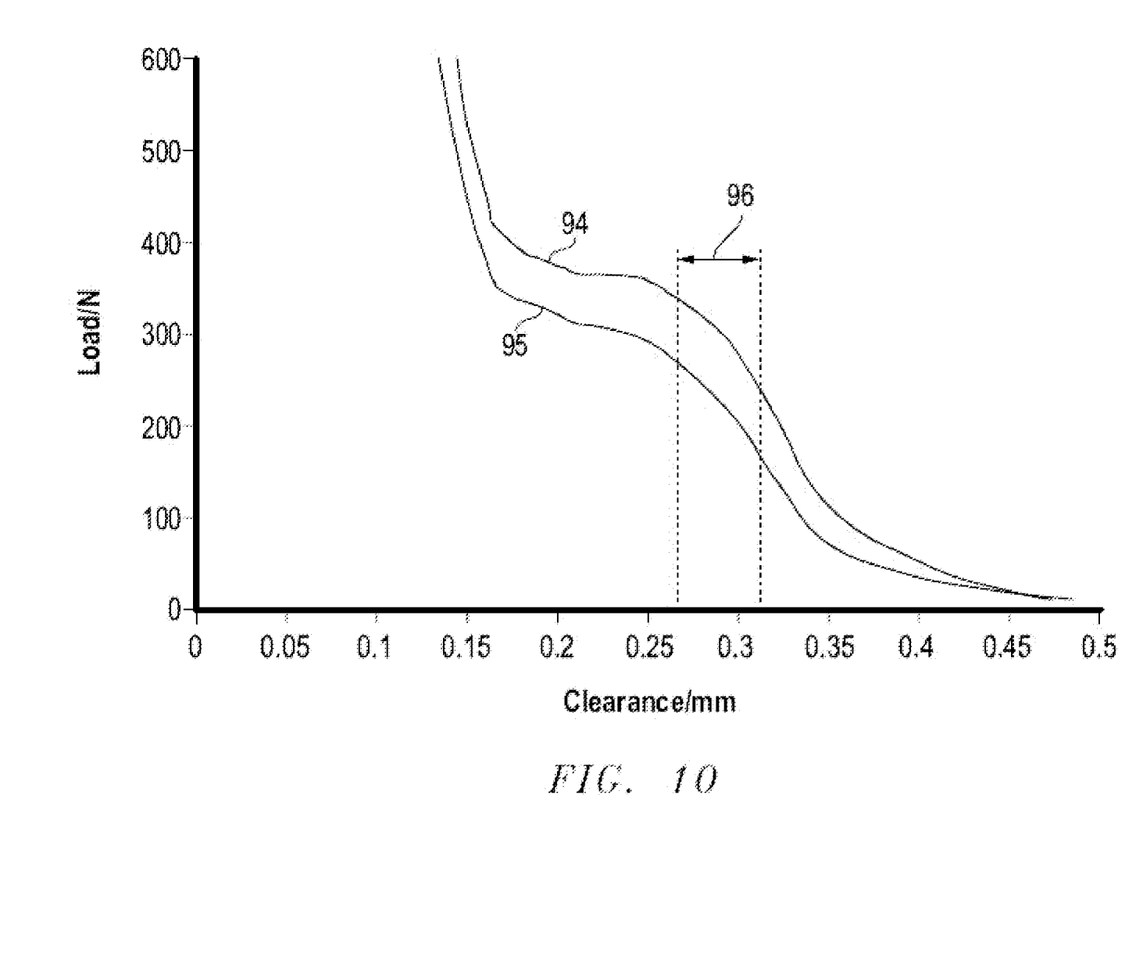
FIG. 10 is a schematic diagram illustrating the different stiffness characteristics of an edge projection and a body projection according to an embodiment of the present disclosure.

FIG. 10 is a graph showing stiffness profiles for an edge projection and a body projection to demonstrate how different compression forces are generated for the same clearance, i.e. annular gap between components. The stiffness profile 94 for the edge projection lies above the stiffness profile 95 for the body projection. In this embodiment, within the tolerance region 96 of typically annular clearances in HDD pivot mounts (i.e. between about 0.27 mm and about 0.31 mm) the edge projection exerts a force that is consistently about 50 N greater than the body projection.

What is claimed is:

1. An apparatus comprising:
   an inner component;
   an outer component; and
   a tolerance ring located between the inner and outer components to provide an interference fit there between, the tolerance ring comprising a strip of material having a length, a first end, a second end opposite the first end, and a plurality of radially extending projections between the first and second ends, the strip of material being curved into a ring having a gap, the radially extending projections being compressible between the inner and outer components, wherein a size of a radially extending projection closest to the first end is different from a size of a radially extending projection closest to a line extending perpendicular to the length and bisecting the strip of material within a circumferential row of the radially extending projections.

2. The apparatus of claim 1, wherein the strip of material includes an unformed region from which the plurality of projections extend.

3. The apparatus of claim 2, wherein the unformed region abuts one of the inner and outer components, and the plurality of projections abut the other of the inner and outer components.

4. The apparatus of claim 1, wherein the tolerance ring includes one or more rows of radially extending projections, axially spaced from one another.

5. The apparatus of claim 1, wherein the plurality of radially extending projections includes one or more edge projections located adjacent to the gap and a plurality of body projections located around the circumference of the ring.

6. The apparatus of claim 5, wherein a width of each edge projection is narrower than a width of each body projection.

7. The apparatus of claim 6, wherein a width of the body projections decrease towards the edge projections.

8. The apparatus of claim 1, wherein the tolerance ring has a stiffness profile that provides an even force around the inner component.

9. The apparatus of claim 1, wherein the size of each radially extending projection includes a circumferential width or a radial height.

10. A preassembly apparatus for a hard disk drive pivot joint comprising:
    an arm having a bore therein or a shaft receivable in a bore; and
    a tolerance ring mounted either within the bore or around the shaft, the tolerance ring comprising a strip of material having a length, a first end, a second end opposite the first end, and a plurality of radially extending projections between the first and second ends, the strip of material being curved into a ring having a gap, the radially extending projections being compressible between the bore and the shaft, wherein a size of a radially extending projection closest to the first end is different from a size of a radially extending projection closest to a line extending perpendicular to the length and bisecting the strip of material within a circumferential row of the radially extending projections.

11. The apparatus of claim 10, wherein the strip of material includes an unformed region from which the plurality of projections extend wherein the unformed region abuts one of bore and the shaft, and the plurality of projections abut the other of the bore and the shaft.

12. The apparatus of claim 10, wherein the plurality of radially extending projections extend radially inward.

13. The apparatus of claim 10, wherein the plurality of radially extending projections extend radially outward.

14. The apparatus of claim 10, wherein the tolerance ring has a stiffness profile that provides an even force around the shaft.

15. The apparatus of claim 10, wherein the tolerance ring has a diameter of less than 16 mm in use.

16. A tolerance ring comprising:

a strip of material having a length, a first end, a second end opposite the first end, and a plurality of radially extending projections between the first and second ends, the strip of material being curved into a ring having a gap, the radially extending projections being compressible between a bore and a shaft, wherein a width and/or a height of a radially extending projection closest to the first end is different from a width and/or a height of a radially extending projection closest to a line extending perpendicular to the length and bisecting the strip of material within a circumferential row of the radially extending projections.

17. The tolerance ring of claim 16, wherein the width of each projection comprises a circumferential width.

18. The tolerance ring of claim 17, wherein the circumferential width of the radially extending projection closest to the first end is less than the circumferential width of the radially extending projection closest to the line extending perpendicular to the length and bisecting the strip of material.

19. The tolerance ring of claim 18, wherein the height of each radially extending projection comprises a radial height.

20. The tolerance ring of claim 19, wherein the radial height of the radially extending projection closest to the first end is greater than the radial height of the radially extending projection closest to the line extending perpendicular to the length and bisecting the strip of material.

* * * * *